United States Patent
Prentice et al.

(10) Patent No.: US 8,226,361 B2
(45) Date of Patent: Jul. 24, 2012

(54) COMPOSITE ARTICLE AND SUPPORT FRAME ASSEMBLY

(75) Inventors: Ian Francis Prentice, Cincinnati, OH (US); Darrell Glenn Senile, Oxford, OH (US)

(73) Assignee: General Electric Company, Schenectady, NY (US)

( * ) Notice: Subject to any disclaimer, the term of this patent is extended or adjusted under 35 U.S.C. 154(b) by 661 days.

(21) Appl. No.: 12/499,377

(22) Filed: Jul. 8, 2009

(65) Prior Publication Data
US 2011/0008163 A1    Jan. 13, 2011

(51) Int. Cl.
*F01D 9/02* (2006.01)

(52) U.S. Cl. .......... 415/191; 415/209.3; 415/209.4; 415/210.1; 415/211.2

(58) Field of Classification Search ............ 415/115, 415/191, 209.3, 209.4, 210.1, 211.2
See application file for complete search history.

(56) References Cited

U.S. PATENT DOCUMENTS

| | | | |
|---|---|---|---|
| 4,180,371 | A | 12/1979 | Ivanko |
| 5,249,920 | A | 10/1993 | Shepherd et al. |
| 5,271,714 | A | 12/1993 | Shepherd et al. |
| 5,372,476 | A | 12/1994 | Hemmelgarn et al. |
| 5,569,019 | A * | 10/1996 | Katariya et al. ............ 415/200 |
| 5,715,596 | A | 2/1998 | Bintz |
| 6,200,092 | B1 | 3/2001 | Koschier |
| 6,375,415 | B1 | 4/2002 | Burdgick |
| 6,652,229 | B2 | 11/2003 | Lu |
| 6,672,833 | B2 | 1/2004 | MacLean et al. |
| 6,676,373 | B2 * | 1/2004 | Marlin et al. ............... 415/191 |
| 6,679,062 | B2 | 1/2004 | Conete et al. |
| 6,742,987 | B2 | 6/2004 | Correia et al. |
| 6,752,592 | B2 | 6/2004 | Mohammed-Fakir et al. |
| 6,884,030 | B2 | 4/2005 | Darkins, Jr. et al. |
| 6,895,757 | B2 | 5/2005 | Mitchell et al. |
| 7,093,359 | B2 * | 8/2006 | Morrison et al. ........ 29/889.71 |
| 7,147,434 | B2 * | 12/2006 | Mons et al. ................. 415/200 |

(Continued)

FOREIGN PATENT DOCUMENTS

EP    0731254 A1    9/1996

(Continued)

OTHER PUBLICATIONS

International Search Report issued in connection with corresponding PCT Application No. PCT/US2010/028131 on Jun. 23, 2010.

*Primary Examiner* — Ninh H Nguyen
(74) *Attorney, Agent, or Firm* — William Scott Andes; Steven J. Rosen

(57) ABSTRACT

A support frame includes a rail engaging a hook of a composite article having plys. The rail included a rail contact surface generally conformal to and contacting a hook contact surface of the hook. The rail and hook contact surfaces being substantially normal to the plys beneath the hook contact surface. One embodiment of the article is a composite nozzle segment including one or more airfoils extending radially between arcuate radially outer and inner band segments having plys curved about a centerline axis and the rail engages a hook of the radially inner band segment. The hook and the rail may be straight or arcuate. The frame includes a central body extending axially aftwardly from the rail to an aft frame flange. A frame pin may be mounted on the frame, engage the inner band segment or one of the airfoils, and may extend into a cavity in the airfoil.

33 Claims, 16 Drawing Sheets

U.S. PATENT DOCUMENTS

| | | |
|---|---|---|
| 7,234,306 B2 | 6/2007 | Aumont et al. |
| 7,237,388 B2 | 7/2007 | Aumont et al. |
| 2003/0133790 A1 | 7/2003 | Darkins |
| 2005/0265831 A1 | 12/2005 | Broderick |
| 2008/0112804 A1 | 5/2008 | Bhate et al. |
| 2009/0110549 A1 | 4/2009 | Snook et al. |

FOREIGN PATENT DOCUMENTS

| | | |
|---|---|---|
| GB | 2390402 A | 1/2004 |
| GB | 2395234 A | 5/2004 |

* cited by examiner

COMPOSITE ARTICLE AND SUPPORT FRAME ASSEMBLY

BACKGROUND OF THE INVENTION

1. Field of the Invention

The invention relates to support of composite articles having plys and, more particularly, to the support of composite turbine nozzles.

2. Description of Related Art

A typical gas turbine engine of the turbofan type generally includes a forward fan and a booster or low pressure compressor, a middle core engine, and a low pressure turbine which powers the fan and booster or low pressure compressor. The core engine includes a high pressure compressor, a combustor and a high pressure turbine in a serial flow relationship. The high pressure compressor and high pressure turbine of the core engine are connected by a high pressure shaft. High pressure air from the high pressure compressor is mixed with fuel in the combustor and ignited to form a high energy gas stream. The gas stream flows through the high pressure turbine, rotatably driving it and the high pressure shaft which, in turn, rotatably drives the high pressure compressor.

The gas stream leaving the high pressure turbine is expanded through a second or low pressure turbine. The low pressure turbine rotatably drives the fan and booster compressor via a low pressure shaft. The low pressure shaft extends through the high pressure rotor. Most of the thrust produced is generated by the fan. Marine or industrial gas turbine engines have low pressure turbines which power generators, ship propellers, pumps and other devices while turboprops engines use low pressure turbines to power propellers usually through a gearbox.

The high pressure turbine has a turbine nozzle which is usually segmented and includes an annular ring or row of turbine nozzle segments. Each segment includes circumferentially spaced apart airfoils radially extending between radially inner and outer bands. The airfoils are usually hollow having an outer wall that is cooled with cooling air from the compressor. Hot gases flowing over the cooled turbine vane outer wall produces flow and thermal boundary layers along outer surfaces of the vane outer wall and end wall surfaces of the inner and outer bands over which the hot gases pass.

Conventional segments have been made of metal and, more recently, designs have been developed incorporating composite material for parts of or all of the segments. Composite materials offer greater thermal protection and allow the turbine to operate at higher temperatures and reduce the amount of cooling air. These lead to improved component life and engine efficiency.

The composite materials are made of plys. Composite material nozzles and composite articles in general are somewhat brittle as compared to their metallic counterparts. First stage high pressure turbine nozzle segments are frequently simply supported at both the inner and outer ends. Since the two supports move relative to each other due to changing engine conditions and, thus, the nozzle segment must be able to rock and slide relative to the supports to remain in contact with both. A high pressure drop exists across contact areas between the nozzle and the supports during engine operation making it difficult to maintain contact without inducing concentrated stresses in the segment. Stresses are particularly detrimental to composite material components of the turbine nozzle and its segments.

The nozzle bands are arcuate to conform to the annulus of the engine. An arc shaped contact between the band and support creates an uneven load distribution as the nozzle rocks and opens large leakage areas. At the inner band, especially the available space is small, the axial extent being limited by an adjacent turbine blade attachment. Metal turbine nozzles include a support rail typically cast as part of the nozzle segment, approximately ¾ of the axial distance back from the leading edge of the inner band or platform. This is machined to form a chordal hinge or chordal seal. The geometry local to the contact area is shaped such that the contact occurs along a straight line (chord). This allows the vane segment to rock without changing the load distribution or increasing leakage.

A similar feature in a composite nozzle would result in the support loads being carried in shear between plys in the band and result in inter-laminar tension where the rail attaches to the bands. The strength in these loading directions is low for the intended material making this approach unsatisfactory. Such a design can also lead to delamination of the plys in the bands. It is desirable to provide a support for composite turbine nozzle segments and composite articles in general that eliminate or reduce support loads being carried in shear between plys. More particularly, it is desirable to provide a support for composite turbine nozzle segments that eliminate or reduce support loads being carried in shear between plys in the bands of composite turbine nozzle segments.

SUMMARY OF THE INVENTION

A composite article and frame assembly includes a composite article having plys, a support frame including a rail engaging a hook of the composite article, a rail contact surface on the rail generally conformal to and contacting a hook contact surface of the hook, and the rail and hook contact surfaces being substantially normal to the plys beneath the hook contact surface. The hook and the rail may be straight or arcuate. The composite article may be a composite nozzle segment including one or more hollow airfoils extending radially between radially outer and inner band segments and the outer and inner band segments being arcuate and curved about a centerline axis.

A composite nozzle segment and frame assembly includes a composite nozzle segment including one or more hollow airfoils extending radially between arcuate radially outer and inner band segments having plys and curved about a centerline axis, a support frame including a rail engaging a hook of the radially inner band segment, a rail contact surface of the rail generally conformal to and contacting a hook contact surface of the hook, and the rail and hook contact surfaces being substantially normal to the plys beneath the hook contact surface.

The frame may include a central body extending axially aftwardly from the rail to an aft frame flange and a mounting flange extending radially inwardly from a forward position of the central body aft of the rail. A frame pin or a tab may be mounted on the frame, engage the inner band segment or one of the airfoils, and extend into a cavity of the airfoil. The frame pin may be screwed into a threaded boss on the frame.

A clamped assembly may further include the frame clamped to the composite nozzle segment by a clamp having a threaded rod extending through a cavity of one of the hollow airfoils. The rod may be screwed into a threaded boss on the frame and have a load spreader attached to a radially outer end of the rod with a nut such that the load spreader engages the outer band segment to clamp the frame to the composite nozzle segment.

A turbine nozzle and support assembly includes a circular row of the composite nozzle segments and each composite nozzle segment contacts a frame for transferring axial loads from the composite nozzle segment to an aft nozzle support. The frame may include a central body extending axially aftwardly from the rail to an aft frame flange having an aft facing peaked surface. An axial load path extends axially through the frame to a support flange of the aft nozzle support.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
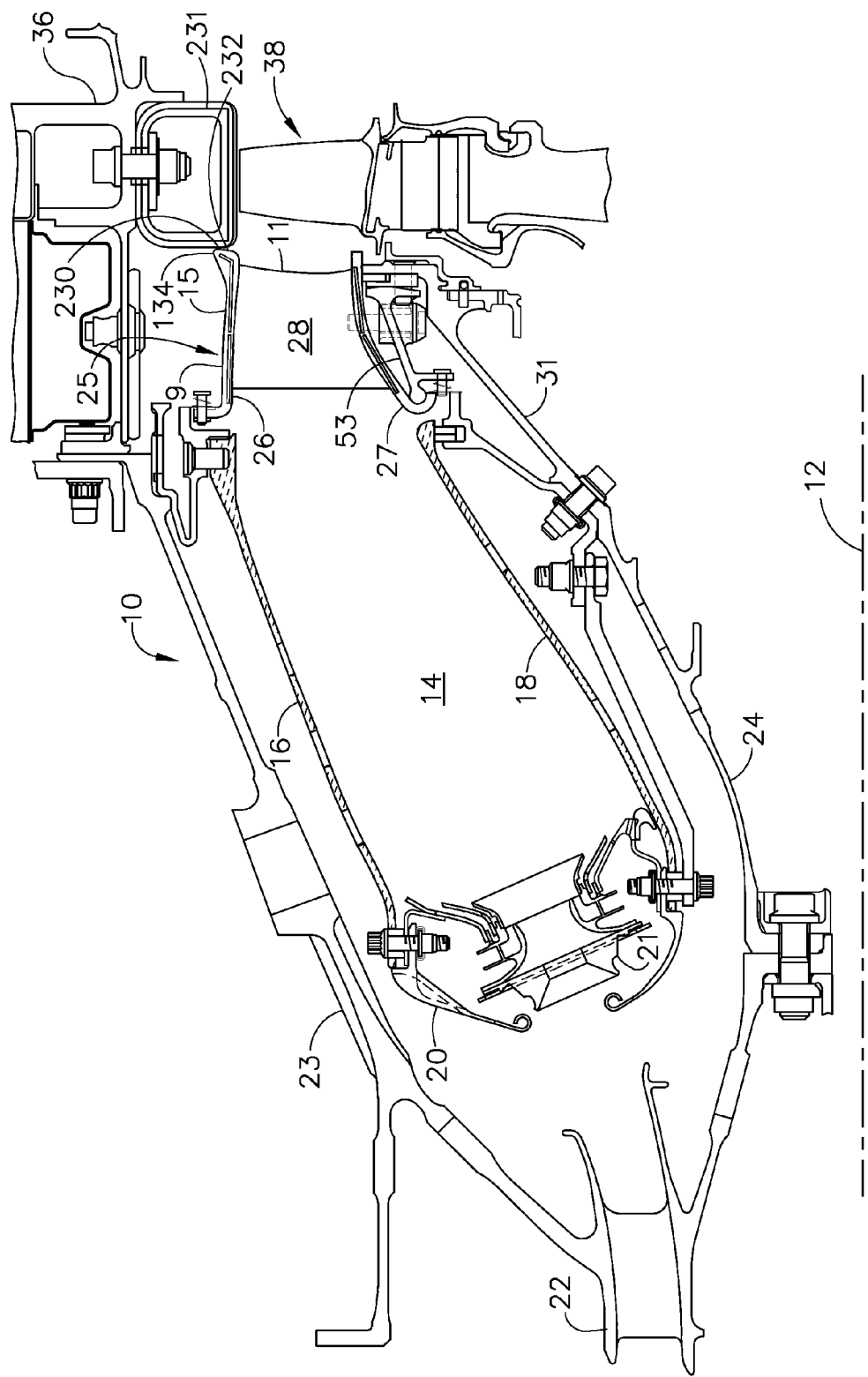
FIG. 1 is a longitudinal, sectional view illustration of exemplary embodiment of an aircraft gas turbine engine combustor and a composite turbine nozzle of a high pressure turbine section of the engine.

Illustrated in FIG. 1 is an exemplary gas turbine engine combustor 10 for generating combustion gases that are discharged to a high pressure turbine 38 downstream of the combustor 10 and used to drive a high pressure compressor (not shown) upstream of the combustor 10 through suitable shaft (not shown). A longitudinal or axial centerline axis 12 is provided through the gas turbine engine and the combustor 10 for reference purposes. The combustor 10 includes a combustion chamber 14 defined by a radially outer combustion liner 16, a radially inner combustion liner 18 and a dome 20 for supporting fuel/air mixers 21 with fuel nozzles (not shown) centrally supported therein.

Directly upstream of the dome 20 is a compressor discharge assembly 22 that is structurally tied to a radially outer combustor casing 23 and structurally supports a radially inner combustor casing 24. The outer and inner combustion liners 16, 18 are radially disposed between and axially and radially supported by the outer and inner combustor casings 23, 24.

A segmented first stage turbine nozzle 25 located directly downstream of the combustor 10 is circumscribed about the centerline axis 12 and provided to direct the flow of combustion gases into the high pressure turbine 38. The segmented first stage turbine nozzle 25 is supported on a turbine shroud 231 or shroud hanger of the high pressure turbine 38. The turbine shroud 231 or shroud hanger is supported by a turbine casing 36 attached to the outer combustor casing 23. A conical turbine support 31 attached to the inner combustor casing 24 and provides radial and axial support and locating of the first stage turbine nozzle 25.

Referring more particularly to FIGS. 1, 2, 6, and 7, the segmented turbine nozzle 25 includes a circular row 9 of composite nozzle segments 11 including one or more solid or hollow airfoils 28 extending radially between integrally formed or joined radially outer and inner band segments 26, 27. The outer and inner band segments 26, 27 are arcuate and are curved about the centerline axis 12. Each of the airfoils 28 includes pressure and suction sides 29, 30 extending axially between airfoil leading and trailing edges LE, TE and extending radially with respect to the centerline axis 12, between airfoil base and tips, 40, 42 at the inner and outer band segments 27, 26 respectively. The inner and outer band segments 27, 26 include segment leading and trailing edges 44, 46 generally corresponding to the airfoil leading and trailing edges LE, TE, respectively.

Figure 3:
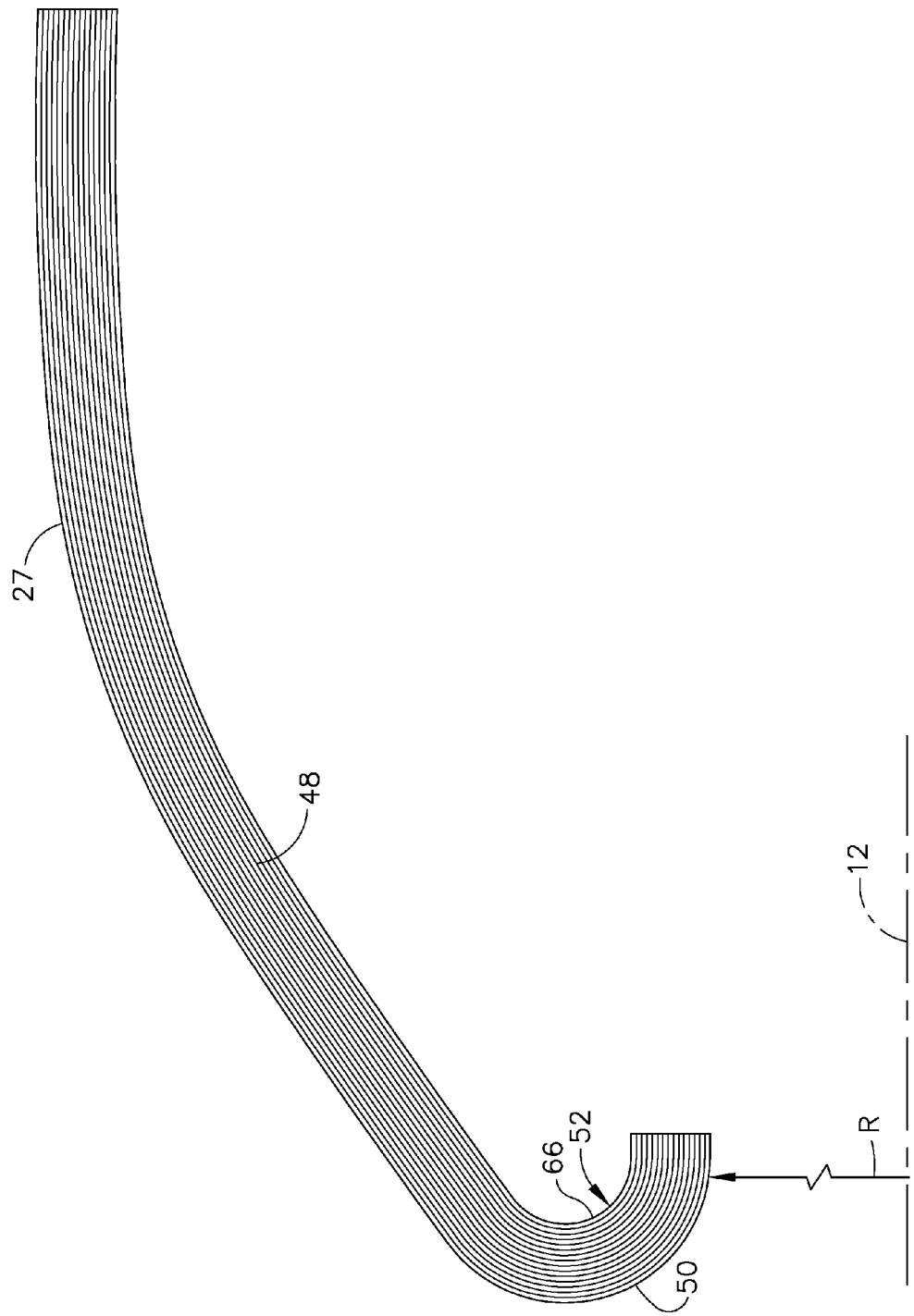
FIG. 3 is an enlarged cross-sectional view illustration of the inner band and its plies of the turbine nozzle illustrated in FIG. 1.
Figure 4:
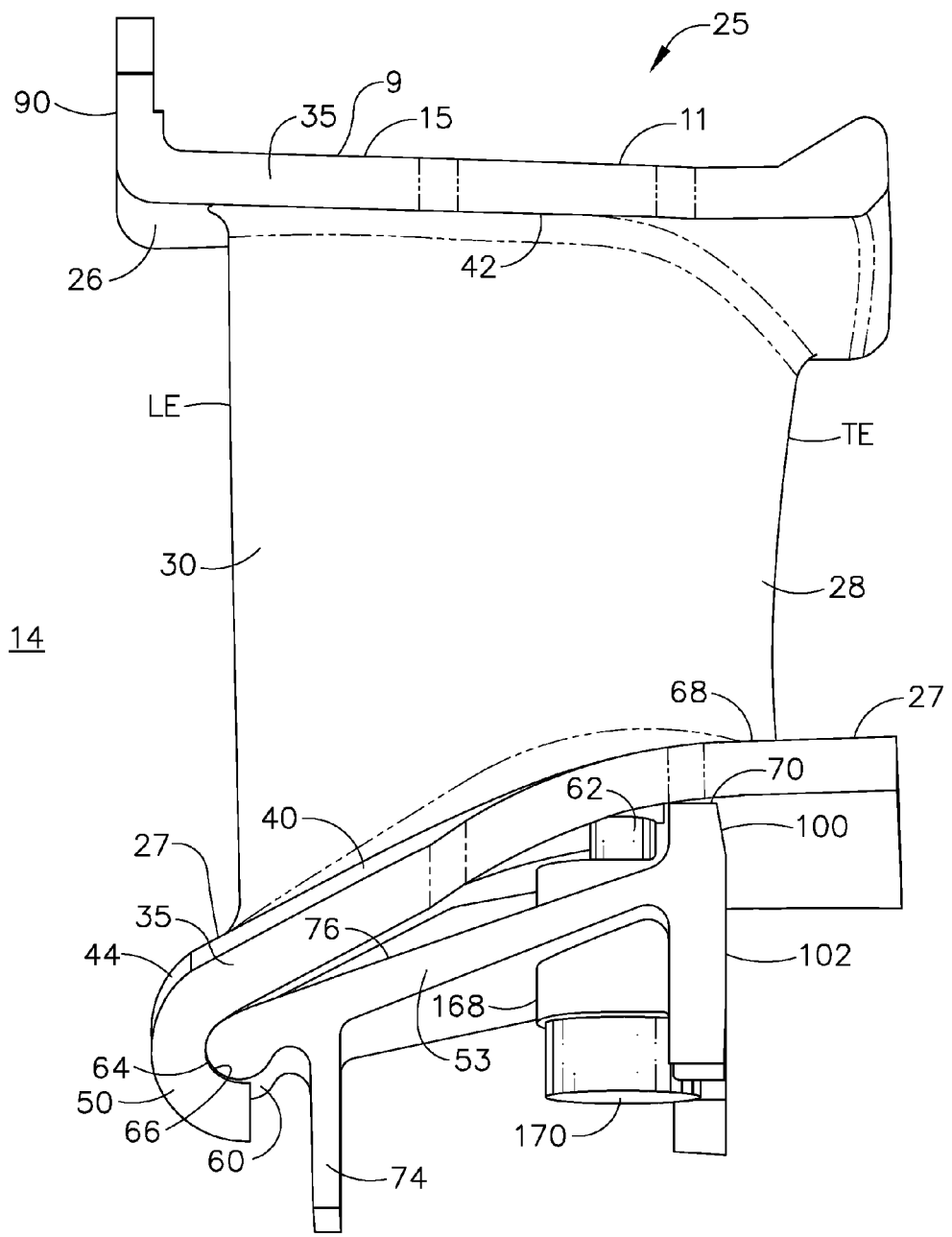
FIG. 4 is a circumferential perspective view illustration of the composite turbine nozzle segment and inner band support of the turbine nozzle illustrated in FIG. 2.
Figure 5:
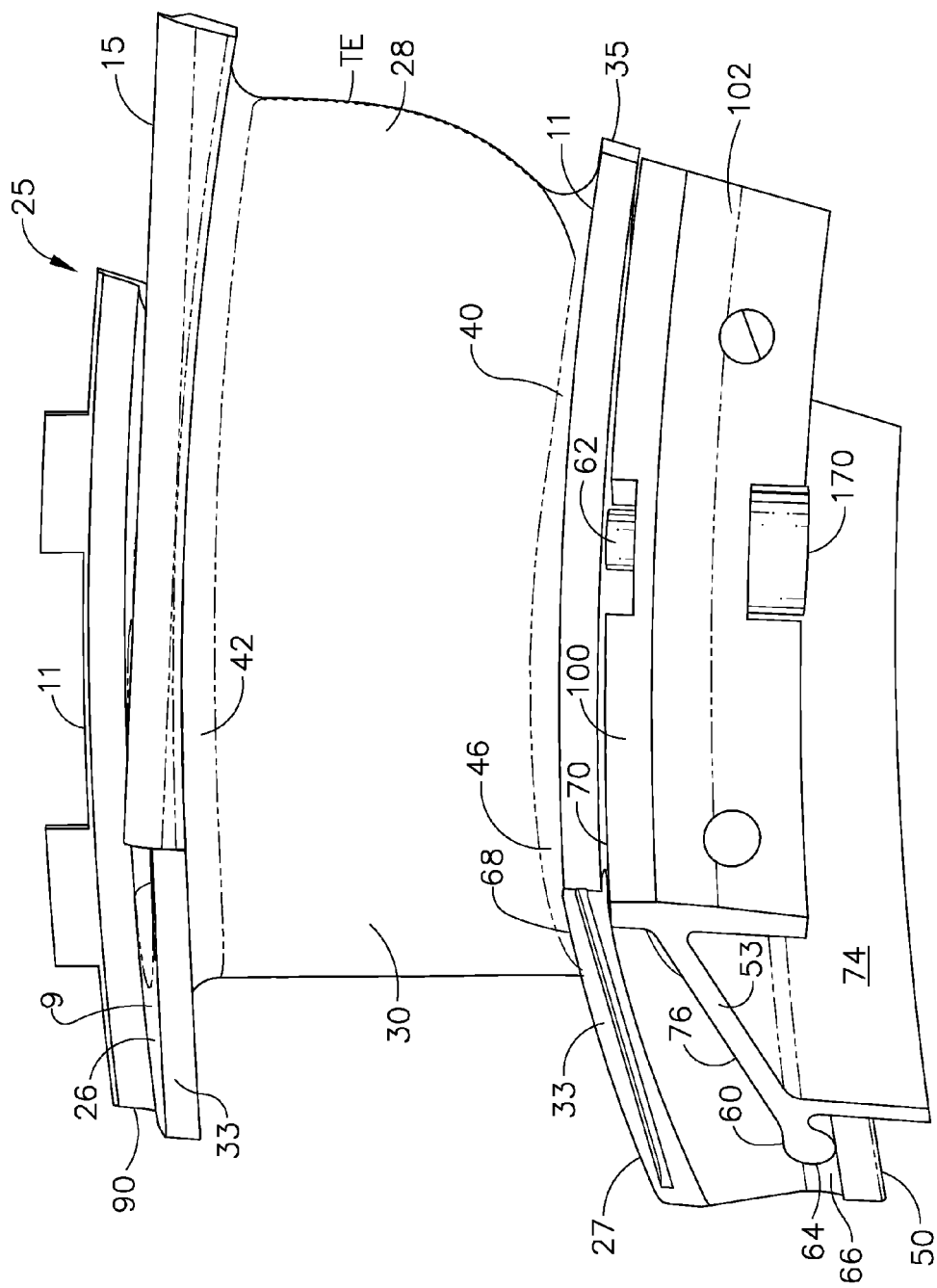
FIG. 5 is an aft looking forward perspective view illustration of the composite turbine nozzle segment and inner band support of the turbine nozzle illustrated in FIG. 2.
Figure 6:
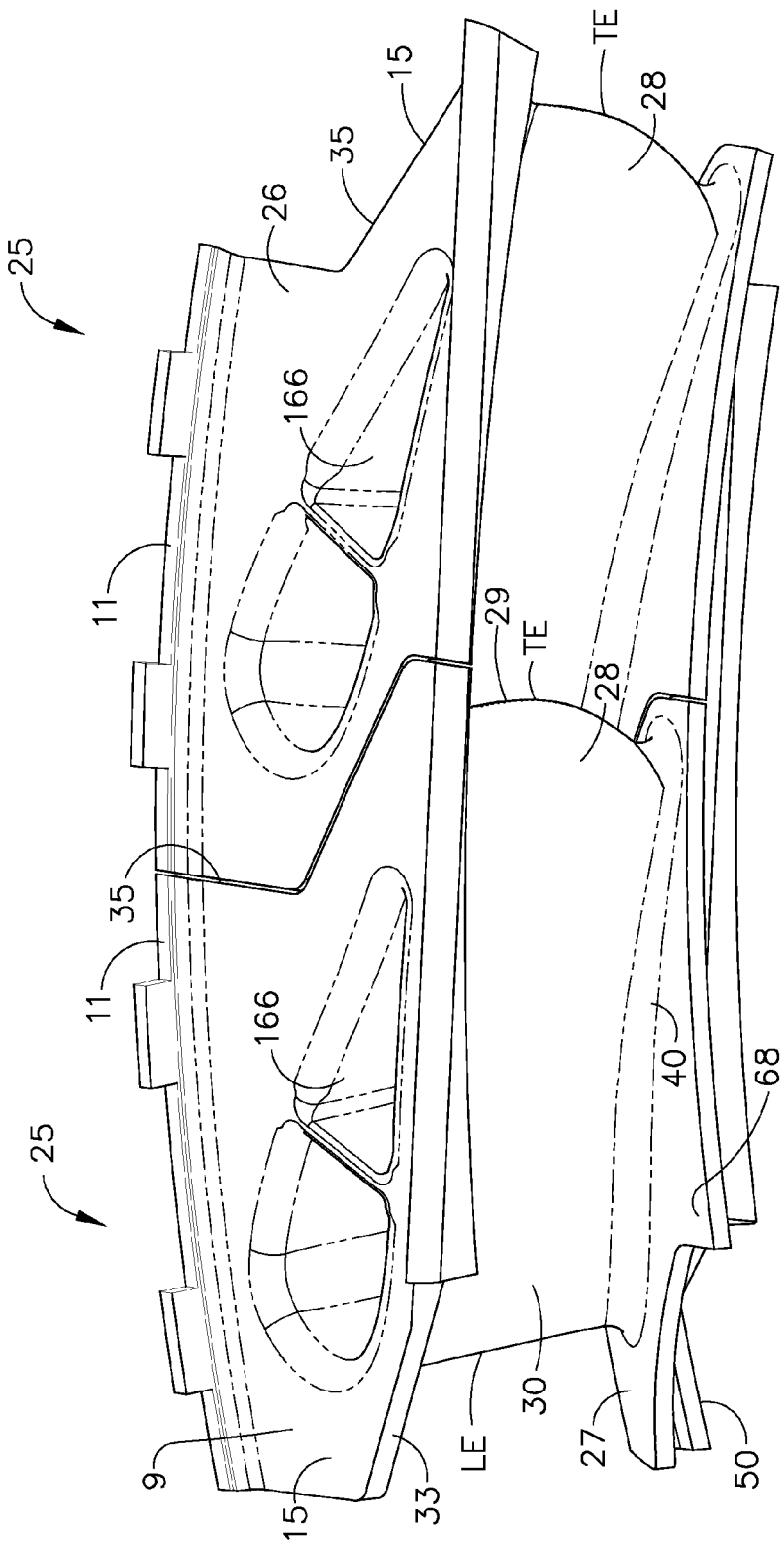
FIG. 6 is a forwardly and radially inwardly looking perspective view illustration of two adjacent single turbine nozzle segments of the turbine nozzle illustrated in FIG. 2.
Figure 7:
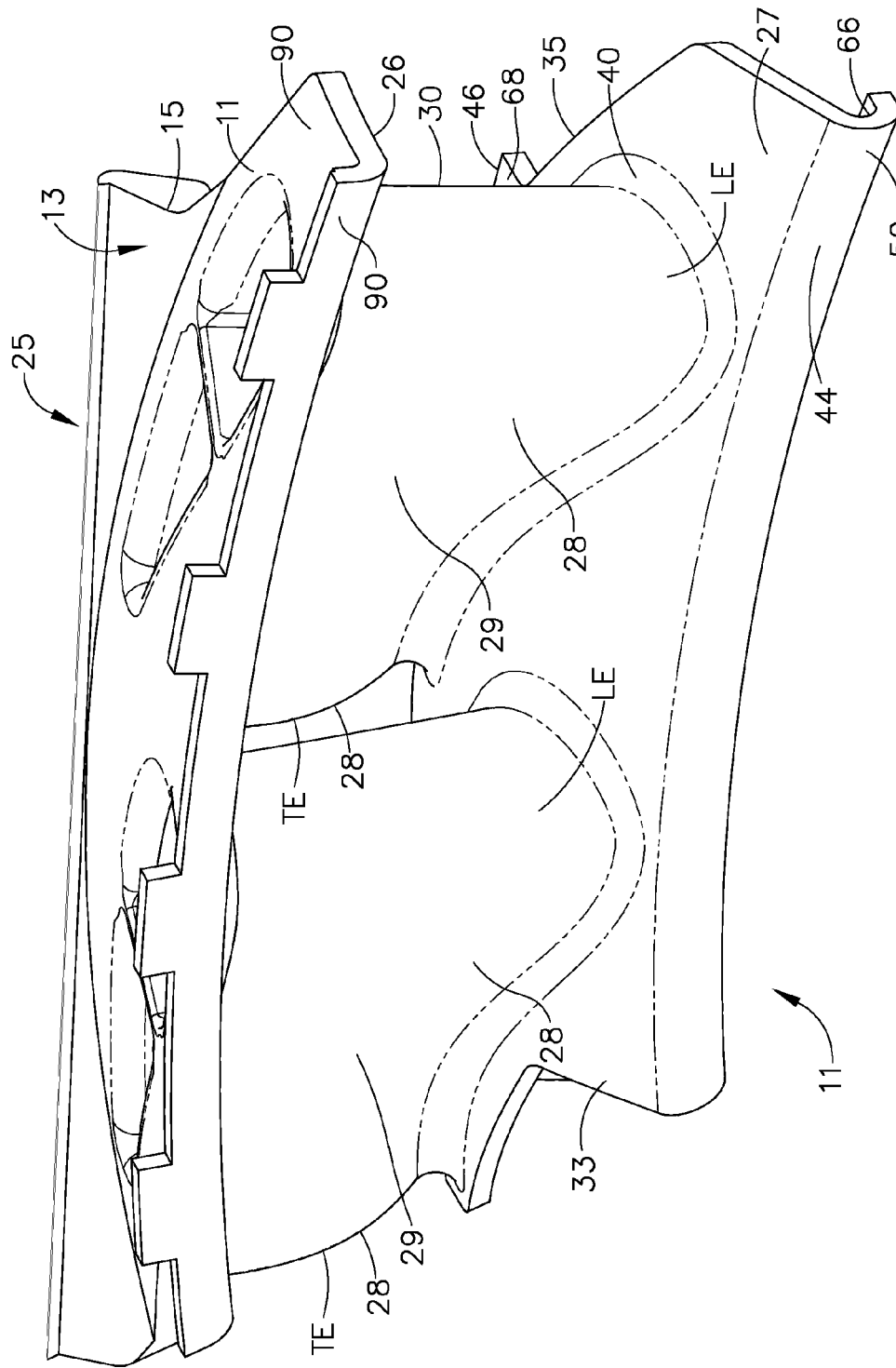
FIG. 7 is an aftwardly and radially inwardly looking perspective view illustration of a doublet turbine nozzle segment.
Figure 8:
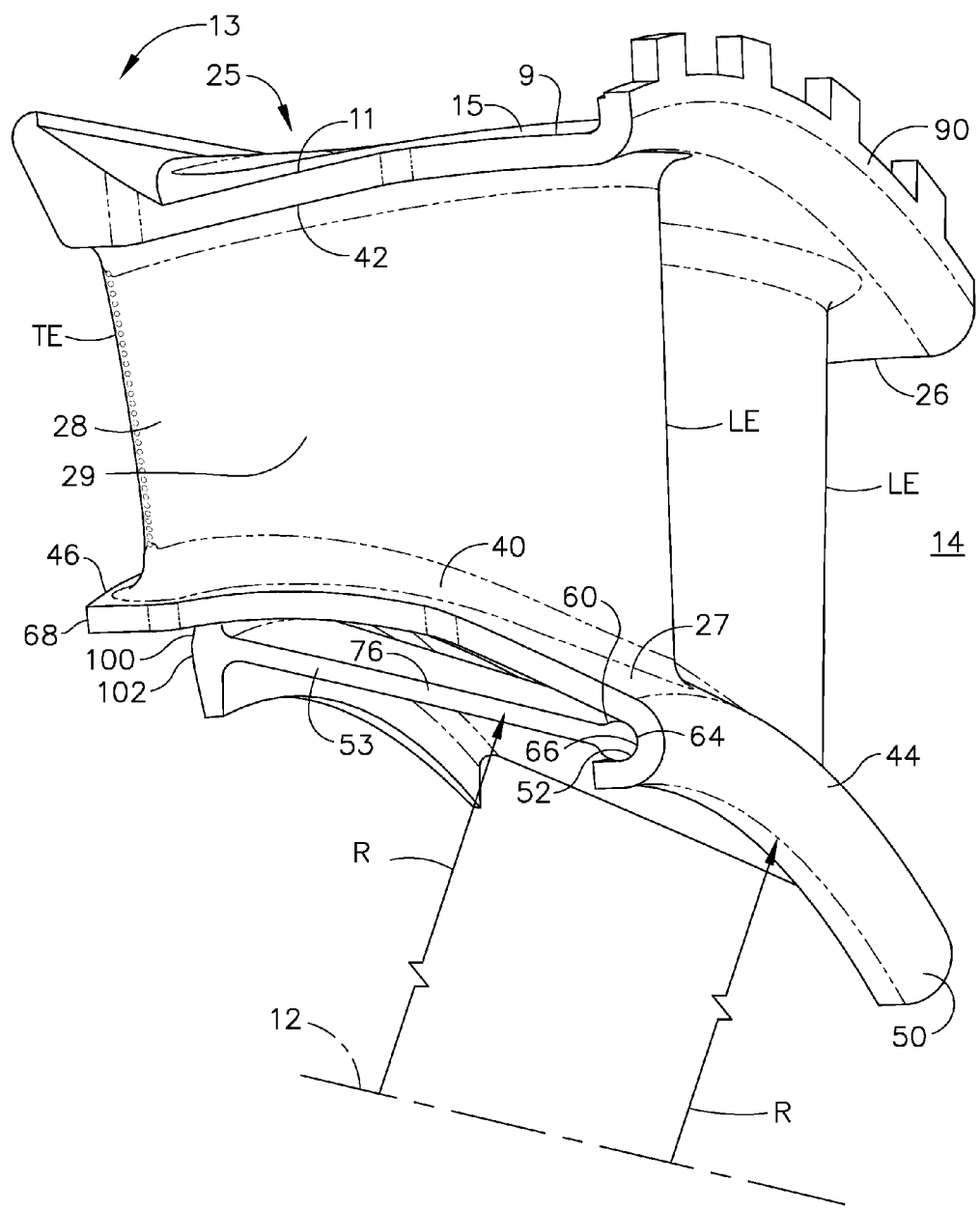
FIG. 8 is an aftwardly and circumferentially looking perspective view illustration of the doublet turbine nozzle segment illustrated in FIG. 7.

Composite nozzle segments 11 illustrated in FIGS. 4-6 have only one airfoil 28 located between circumferentially spaced apart pressure and suction side edges 33, 35 of the radially outer and inner band segments 26, 27. FIGS. 7 and 8 illustrate an alternative configuration of the composite nozzle segment 11 having two airfoils 28 located between circumferentially spaced apart pressure and suction side edges 33, 35 of the radially outer and inner band segments 26, 27. The composite nozzle segment 11 may have more than two airfoils. The composite nozzle segments 11 illustrated herein are representative of composite articles 15 in general that have plies 48 (illustrated in FIG. 3).

Figure 2:
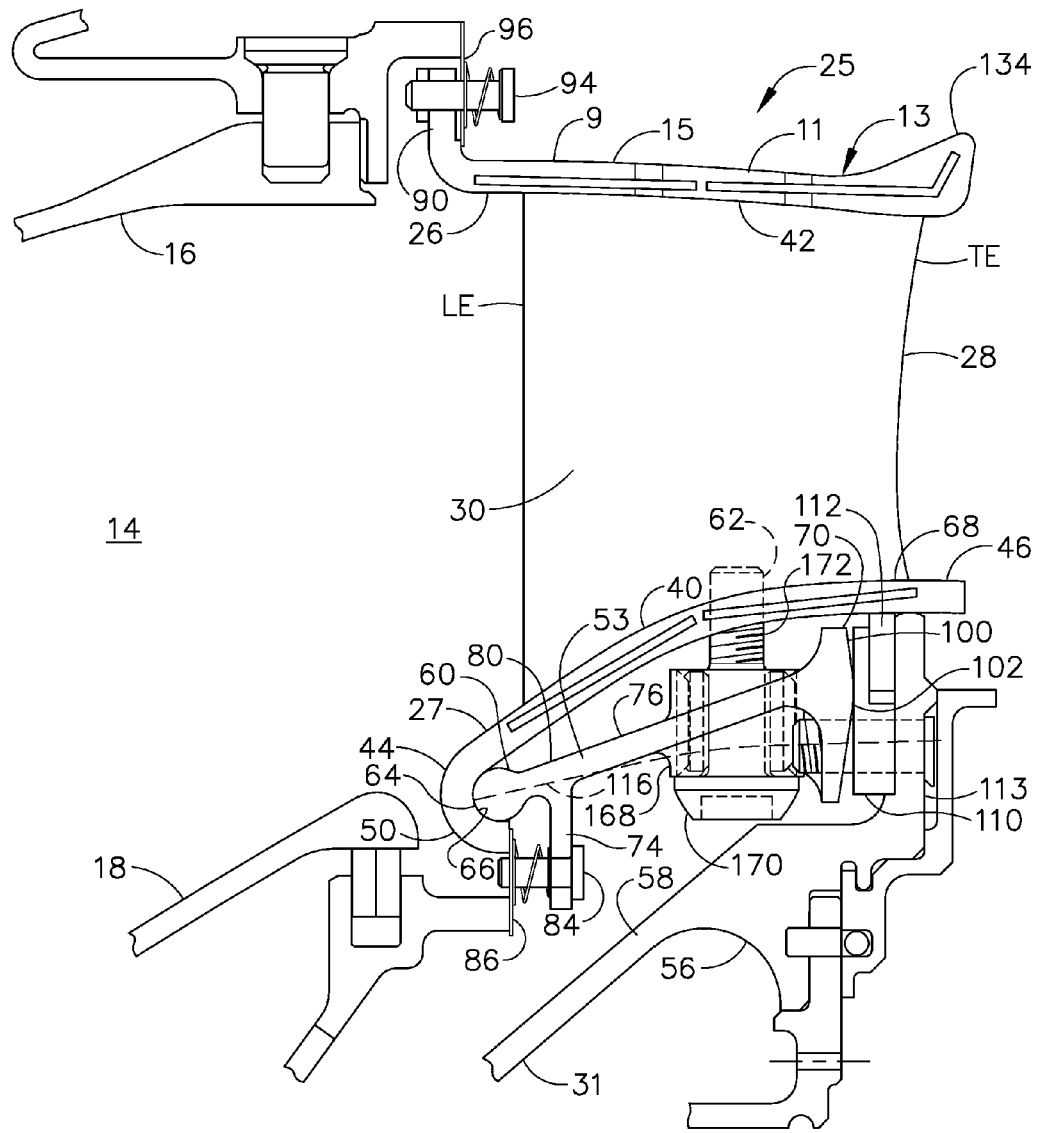
FIG. 2 is an enlarged view of composite inner and outer bands and airfoil therebetween of the turbine nozzle illustrated in FIG. 1.

The airfoils 28 and the outer and inner band segments 26, 27 are made from plies 48 of material that distinctly remain in the airfoils 28 and the outer and inner band segments 26, 27 as illustrated in FIG. 3 which is an end view of the inner band segment 27. Further illustrated in FIGS. 2 and 3 is a hook 50 at the segment leading edge 44 of the inner band segment 27. The hook 50 is curved radially inwardly and axially downstream or aftwardly from the segment leading edge 44.

Figure 10:
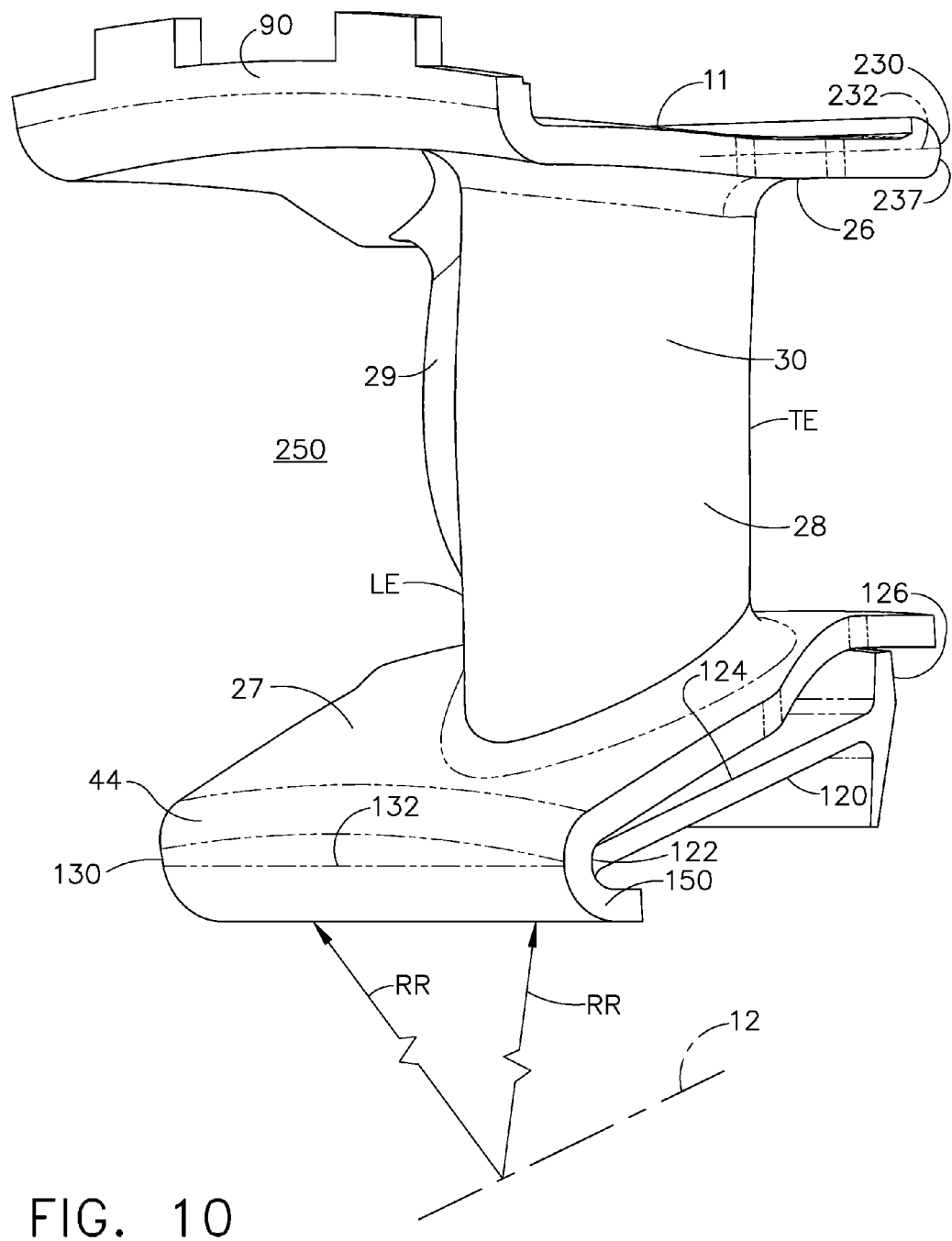
FIG. 10 is a forward looking aft perspective view illustration of an alternative embodiment of the composite turbine nozzle segment illustrated in FIG. 2 with a frame with a straight chordal rail.
Figure 11:
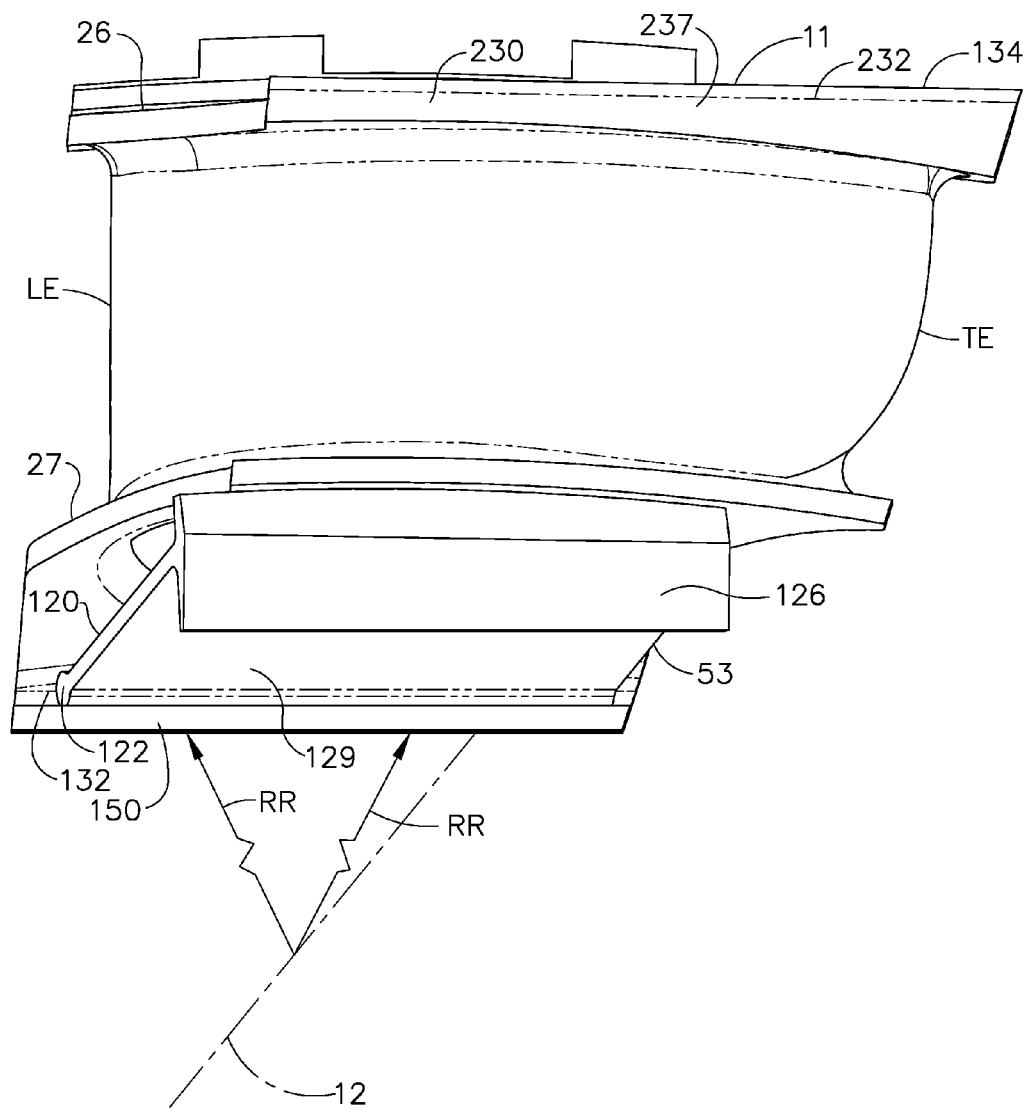
FIG. 11 is an aft looking forward perspective view illustration of the composite turbine nozzle segment and the frame illustrated in FIG. 10.

Referring to FIGS. 3 and 8, the hook 50 is illustrated herein as being arcuate and circumscribed at a radius R about the centerline axis 12. A curved inner surface 52 of the hook 50 is substantially circumferentially co-extensive with the segment leading edge 44 about the axis 12. Alternatively, the hook 50 may be straight and tangential to the radius R about the centerline axis 12, in which case, the hook 50 may be described as being chordal and extending linearly between two circumferentially spaced apart radii RR about the centerline axis 12 as illustrated in FIGS. 10 and 11.

Referring back to FIG. 2, a support frame 53 is used to transfer axial loads from the composite nozzle segment 11 to an aft nozzle support 56 located radially inwardly of the inner band segment 27 and at a support aft end 58 of the conical turbine support 31. The conical turbine support 31 is attached to the inner combustor casing 24 and used for providing radial and axial support and locating of the first stage turbine nozzle 25. The composite nozzle segment 11 and the frame 53 are representative of a composite article and frame assembly 13. The frame 53 is slidably and pivotably restrained within the aft nozzle support 56. Typically, the frame 53 and the aft nozzle support 56 and the conical turbine support 31 are made of metal. A rail 60 of the frame 53 engages the hook 50 to transfer axial and radial loads from the composite nozzle segment 11 to the aft nozzle support 56.

Tangential or circumferential loads are reacted out through the frame 53 by a frame pin 62 or tab mounted on the frame 53 and which engages the inner band segment 27 or the airfoil 28 as illustrated in FIGS. 2, 4, and 5. The frame pin 62 extends into a cavity 166, illustrated in FIG. 5, for a hollow airfoil 28. External threads 172 on the frame pin 62 provide for the frame pin 62 to be screwed into a threaded boss 168 on the frame 53. A head 170 of the frame pin 62, located at a radially inner end 173 of the frame pin 62 engages an internally threaded boss 168 in the frame 53 to secure the frame pin 62 in place. If the airfoil 28 is not hollow then the frame pin 62 could be designed to engage another feature such as a recess machined or molded into the inner band segment 27.

Referring to FIG. 2, the frame 53 extends axially aftwardly or downstream from the rail 60 to an aft frame flange 70 and includes a central body 76 therebetween. The aft frame flange 70 has an aft facing peaked surface 100 that includes an apex 102 at its aftwardmost point. The apex 102 serves as pivot point so that the frame 53 can rock or pivot to accommodate uneven thermal growth between the outer and inner combustor casings 23, 24. The axial compressive loads are reacted out from the composite nozzle segment 11 to the aft nozzle support 56 through the frame 53. The rail 60, the central body 76, and the aft frame flange 70 are arcuate and are curved and circumscribed at respective radii RR about the centerline axis 12 as illustrated in FIG. 8. The turbine nozzle 25 illustrated herein includes a seal retainer 110 used to retain a ring seal 112 against a support flange 113 of the aft nozzle support 56 and the apex 102 of the frame 53 contacts the seal retainer 110. Thus, the axial compressive loads are reacted out from the composite nozzle segment 11 to the support flange 113 of the aft nozzle support 56 through an axial load path 116 through the frame 53, the seal retainer 110 and the ring seal 112 for the embodiment of the turbine nozzle 25 illustrated herein.

A mounting flange 74 extends radially inwardly from a forward position 80 of the central body 76 just somewhat aft of the rail 60. The mounting flange 74 is used to radially support radially inner seal pins 84 that support a flexible radially inner leaf seal 86 that seals between the inner band segment 27 and the inner combustion liner 18. An outer forward flange 90 of the radially outer band segment 26 is used to radially support radially outer seal pins 94 that support a flexible radially outer leaf seal 96 that seals between the outer band segment 26 and the outer combustor casing 23. The frame 53 is illustrated herein as being arcuate and is curved and circumscribed at a radius R about the centerline axis 12 as illustrated in FIG. 8. The frame 53 may be flat and tangential to the radius R about the centerline axis 12, in which case, the frame 53 may be described as being chordal and extending linearly between two circumferentially spaced apart radii about the centerline axis 12 as illustrated in FIG. 10.

Figure 9:
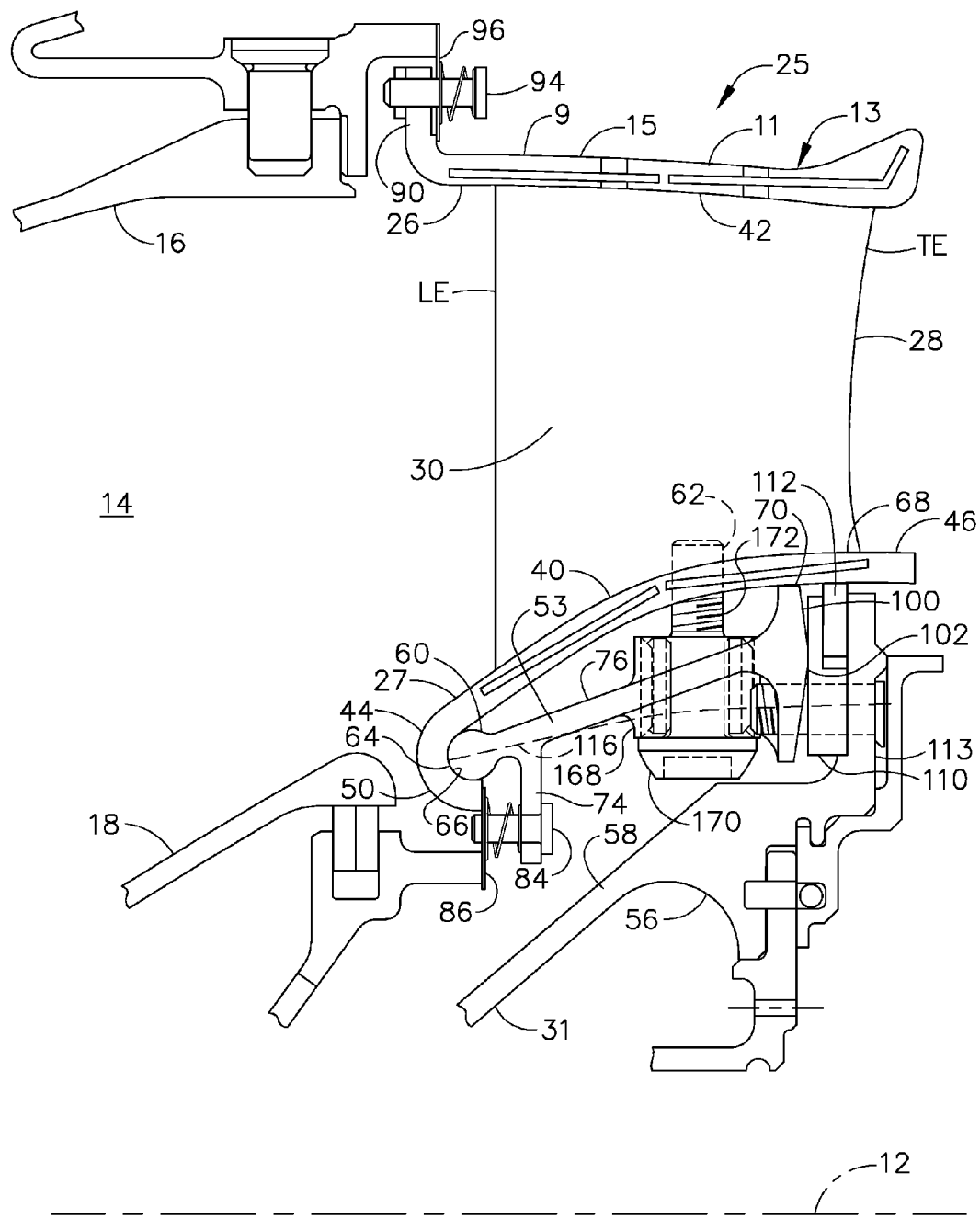
FIG. 9 is an enlarged view of composite inner and outer bands and airfoil therebetween of the turbine nozzle illustrated in FIG. 1 with an alternative aft support for the inner band.

As illustrated in FIGS. 2 and 3, the rail 60 has a rail contact surface 64 that is generally conformal to and contacts a hook contact surface 66. The rail and hook contact surfaces 64, 66 are substantially normal to the plies 48 beneath the hook contact surface 66. This allows the loads, compressive loads for embodiment of hook illustrated herein, to be transferred in a direction along the plies instead of across the plies. The inner band segment 27 may be radially located or supported at an outer band aft end 68 of the inner band segment 27 on the aft frame flange 70 as illustrated in FIG. 2. Alternatively, the inner band segment 27 may be radially located or supported at the outer band aft end 68 of the inner band segment 27 on the aft frame flange 70 of the frame 53 as illustrated in FIG. 9.

Illustrated in FIGS. 10 and 11 is a flat frame 120 having a straight or chordal rail 122, a flat central body 124, and a straight or chordal aft frame flange 126. The composite nozzle segment 11 is generally the same and includes one or more solid or hollow airfoils 28 extending radially between integrally formed or joined radially outer and inner band segments 26, 27. The outer and inner band segments 26, 27 are arcuate and are curved about the centerline axis 12. Each of the airfoils 28 includes pressure and suction sides 29, 30 extending axially between airfoil leading and trailing edges LE, TE and extending radially outwardly, with respect to the centerline axis 12, between airfoil base and tips, 40, 42 at the inner and outer band segments 27, 26 respectively.

A straight or chordal hook 150 is located at the segment leading edge 44 of the inner band segment 27. The chordal hook 150 is straight in the circumferential direction with respect to the centerline axis 12 and curved radially inwardly and axially downstream from the segment leading edge 44. The inner band segment 27 transits from an arcuate shape to a straight shape to accommodate the chordal hook 150. An inner band chordal seal 130 is thus formed between the chordal hook 150 and the inner combustor casing 24 along an inner chordal seal line 132 of the chordal hook 150. The mounting flange 74 is used to radially support radially inner seal pins 84 that support a flexible radially inner leaf seal 86 that seals between the inner band segment 27 and the inner combustor casing 24.

An outer band chordal seal 230 is formed between an outer aft flange 134 of the outer band segment 26 and a turbine shroud 231 along an outer chordal seal line 232 on the outer aft flange 134 as illustrated in FIG. 1. Referring back to FIGS. 10 and 11, the outer chordal seal line 232 passes through a linear or chordal contact area 237 of the outer band chordal seal 230 and the linear or chordal contact area 237 lies on the outer aft flange 134. Alternatively, the outer band chordal seal 230 may be formed between an outer aft flange 134 of the outer band segment 26 and a turbine shroud hanger or other non-rotating static structure near or adjacent the outer chordal seal line 232 on the outer aft flange 134.

Figure 12:
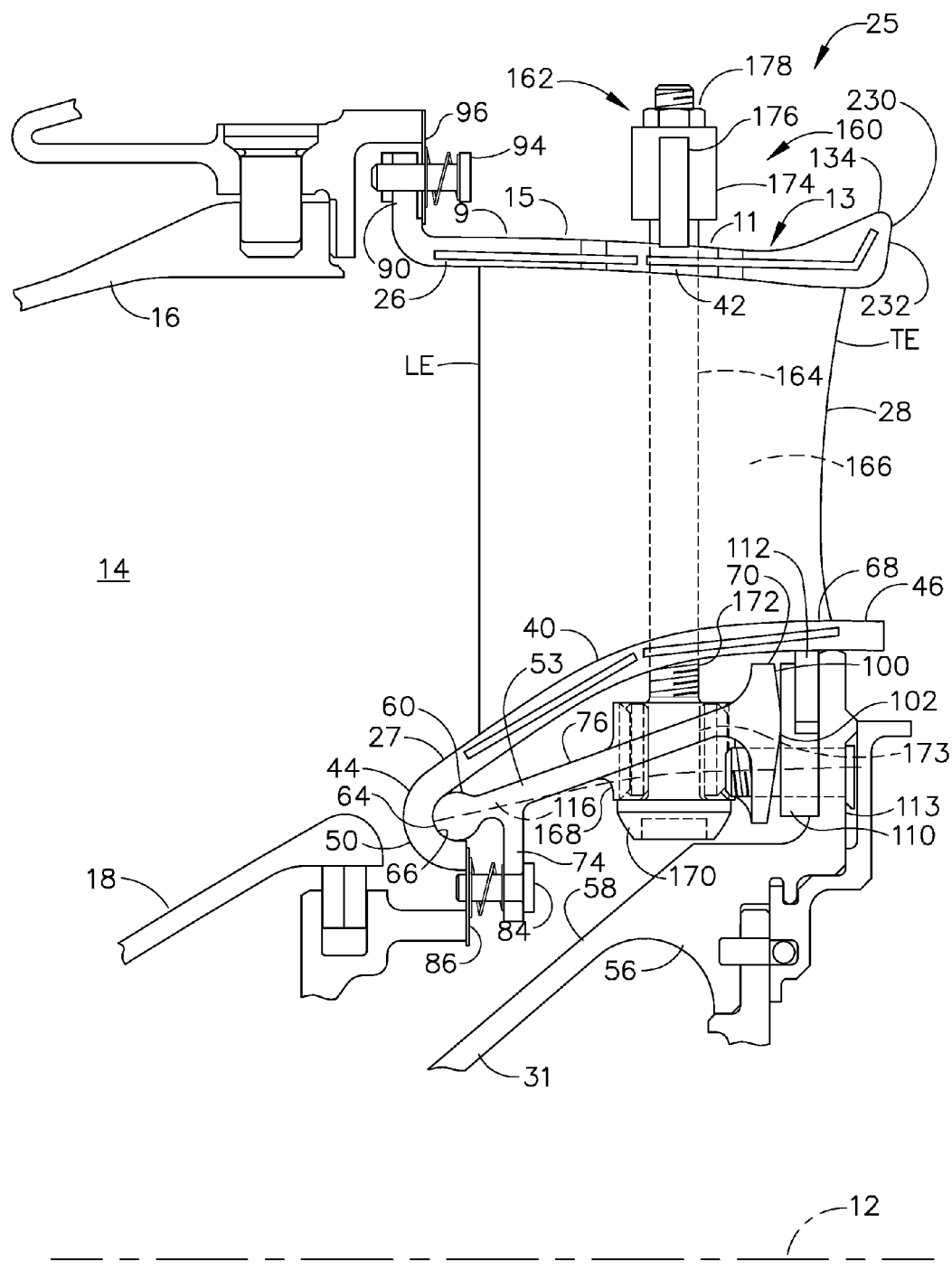
FIG. 12 is a cross-sectional view illustration of a composite turbine nozzle segment and frame clamped assembly.
Figure 13:
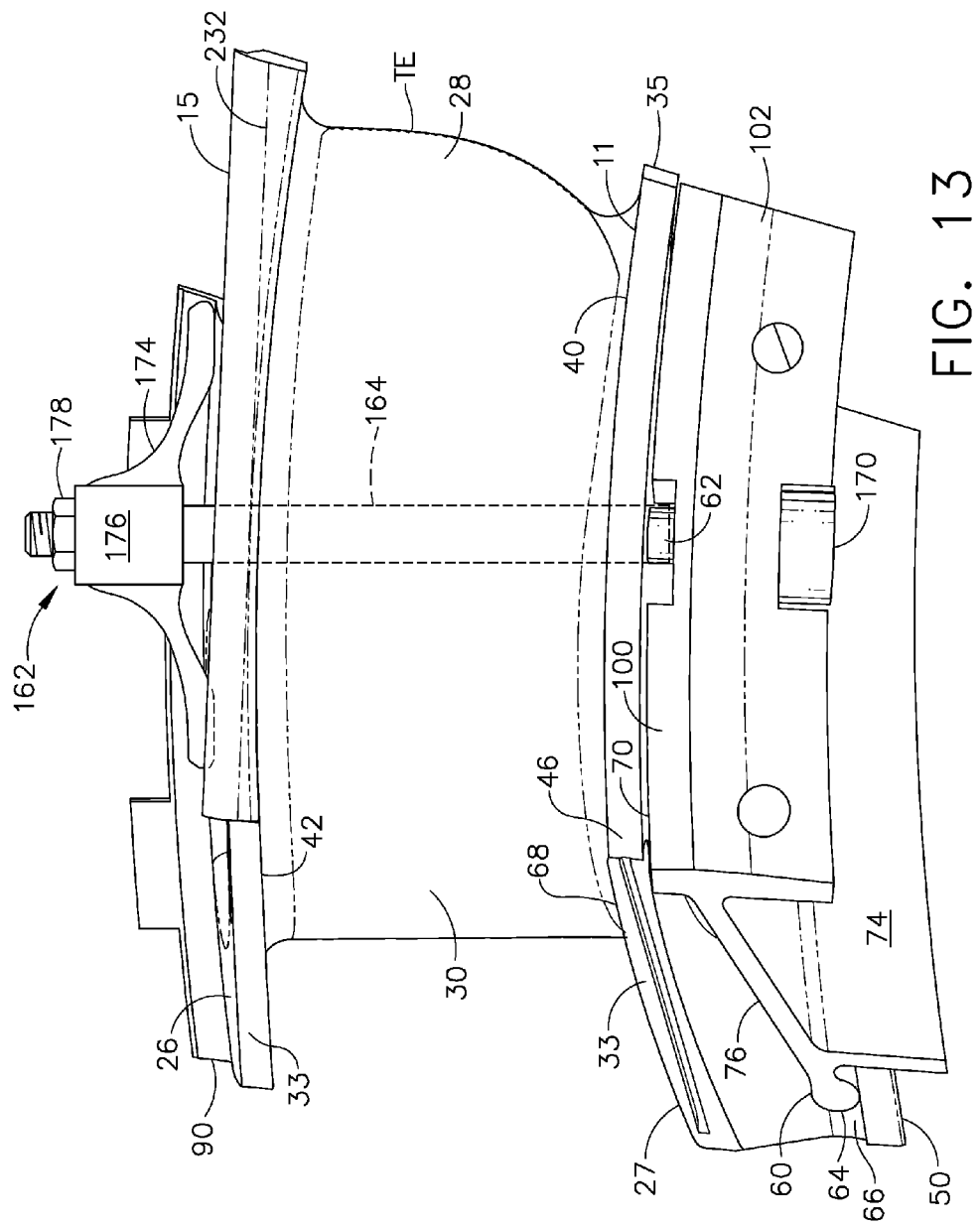
FIG. 13 is an aft looking forward perspective view illustration of the composite turbine nozzle segment and frame assembly illustrated in FIG. 12.

Illustrated in FIGS. 12 and 13 is a clamped frame and nozzle segment assembly 160 in which the frame 53 is clamped to the composite nozzle segment 11 by a clamp 162. The clamp 162 is illustrated herein as having a threaded rod 164 extending through a cavity 166 of the hollow airfoil 28. The rod 164 includes threads 172 which are screwed into a threaded boss 168 on the frame 53. A head 170 at a radially inner end 173 of the rod 164 engages the threaded boss 168. A load spreader 174 is attached to a threaded radially outer end 176 of the rod 164 with a nut 178. The load spreader 174 engages the outer band segment 26 thus clamping the frame 53 to the composite nozzle segment 11.

Figure 14:
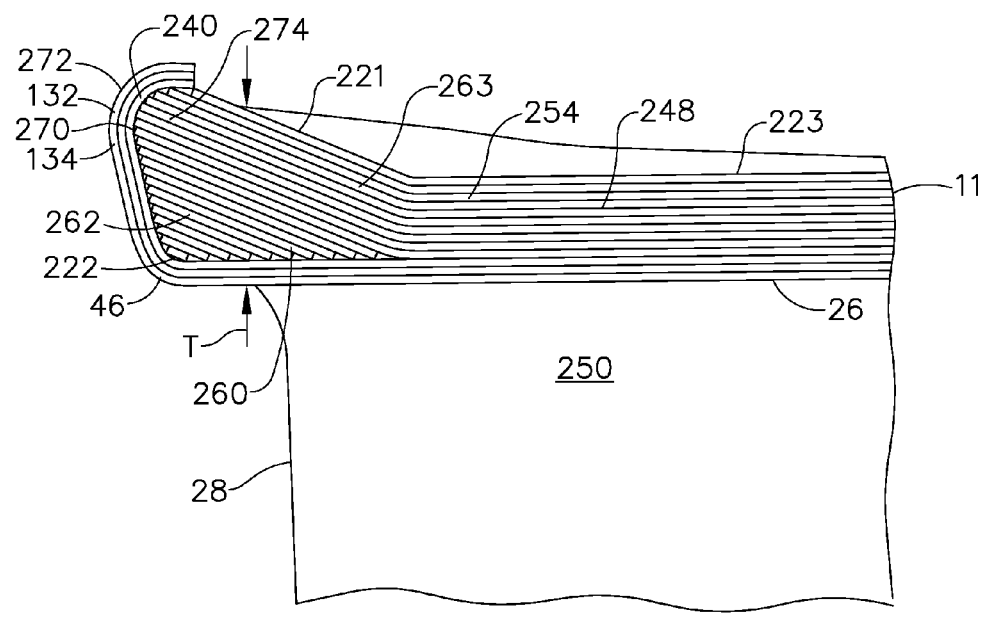
FIG. 14 is a cross-sectional view illustration of a insert plies in outer band of the turbine nozzle illustrated in FIG. 1.
Figure 15:
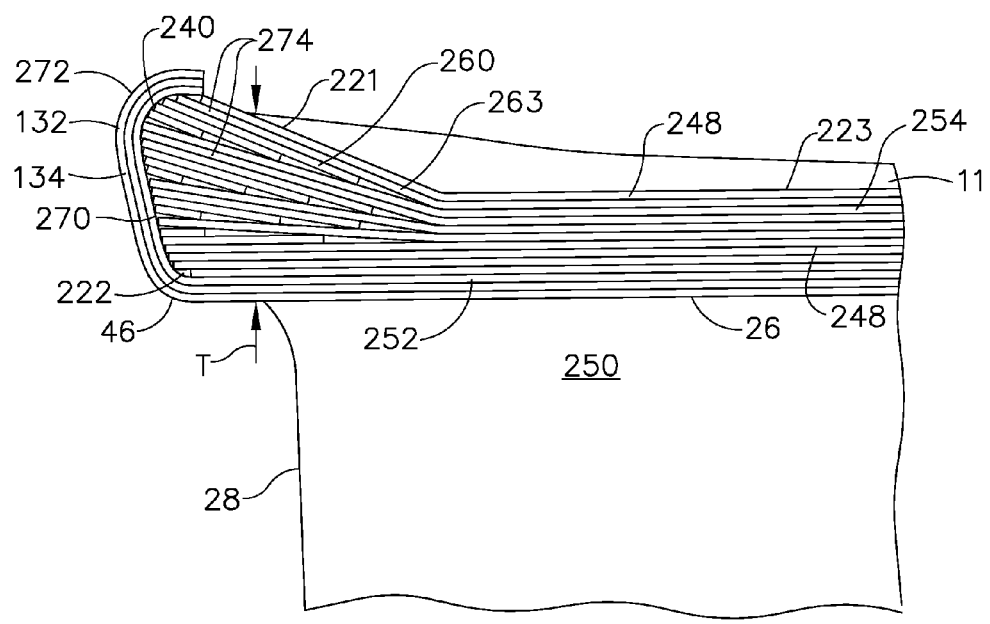
FIG. 15 is a cross-sectional view illustration of interspersed insert plies in outer band of the turbine nozzle illustrated in FIG. 1.
Figure 17:
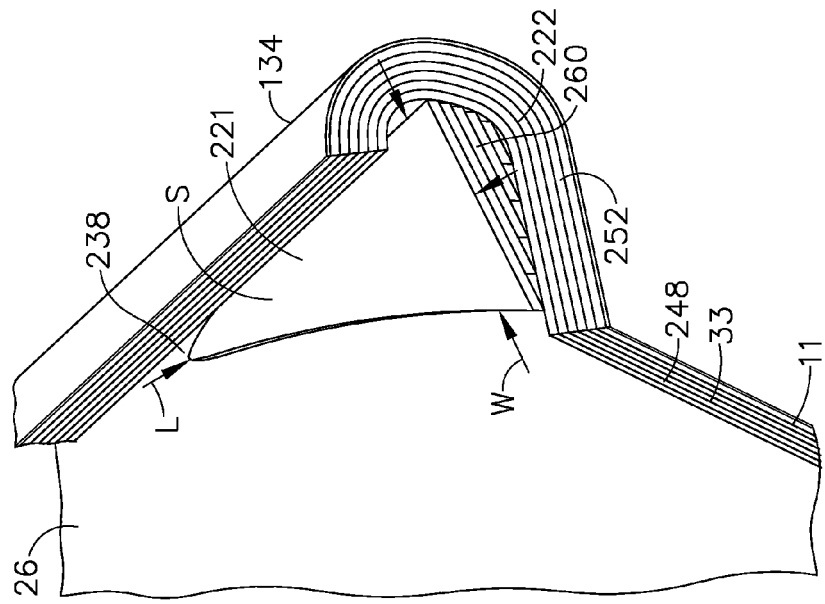
FIG. 17 is a perspective view illustration of insert plies along a pressure side edge of the outer band of the turbine nozzle illustrated in FIG. 15.
Figure 16:
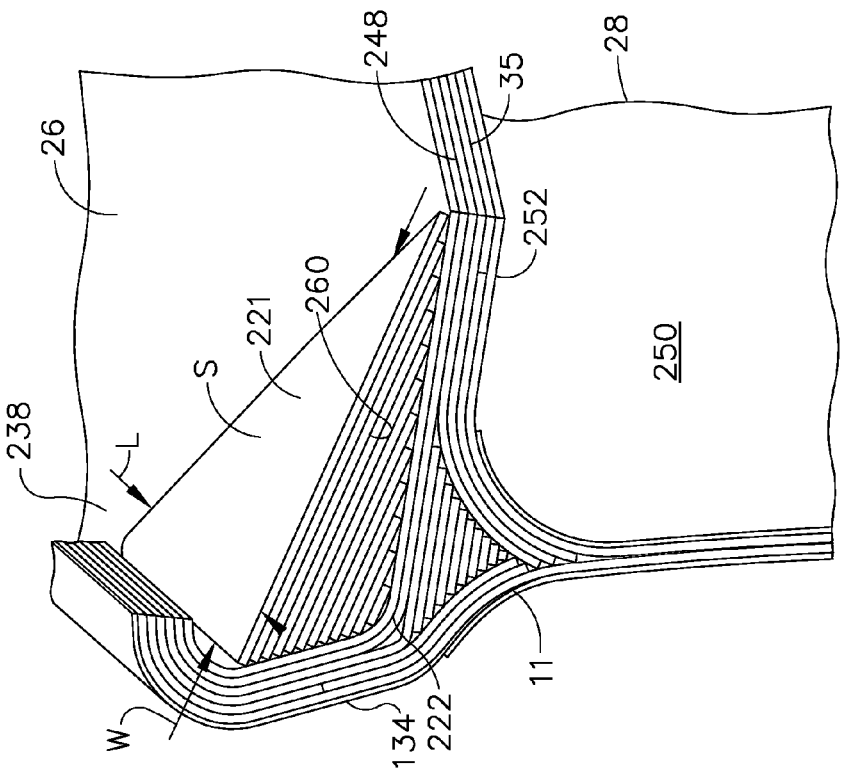
FIG. 16 is a perspective view illustration of the insert plies along a suction side edge of the outer band of the turbine nozzle illustrated in FIG. 15.
Figure 18:
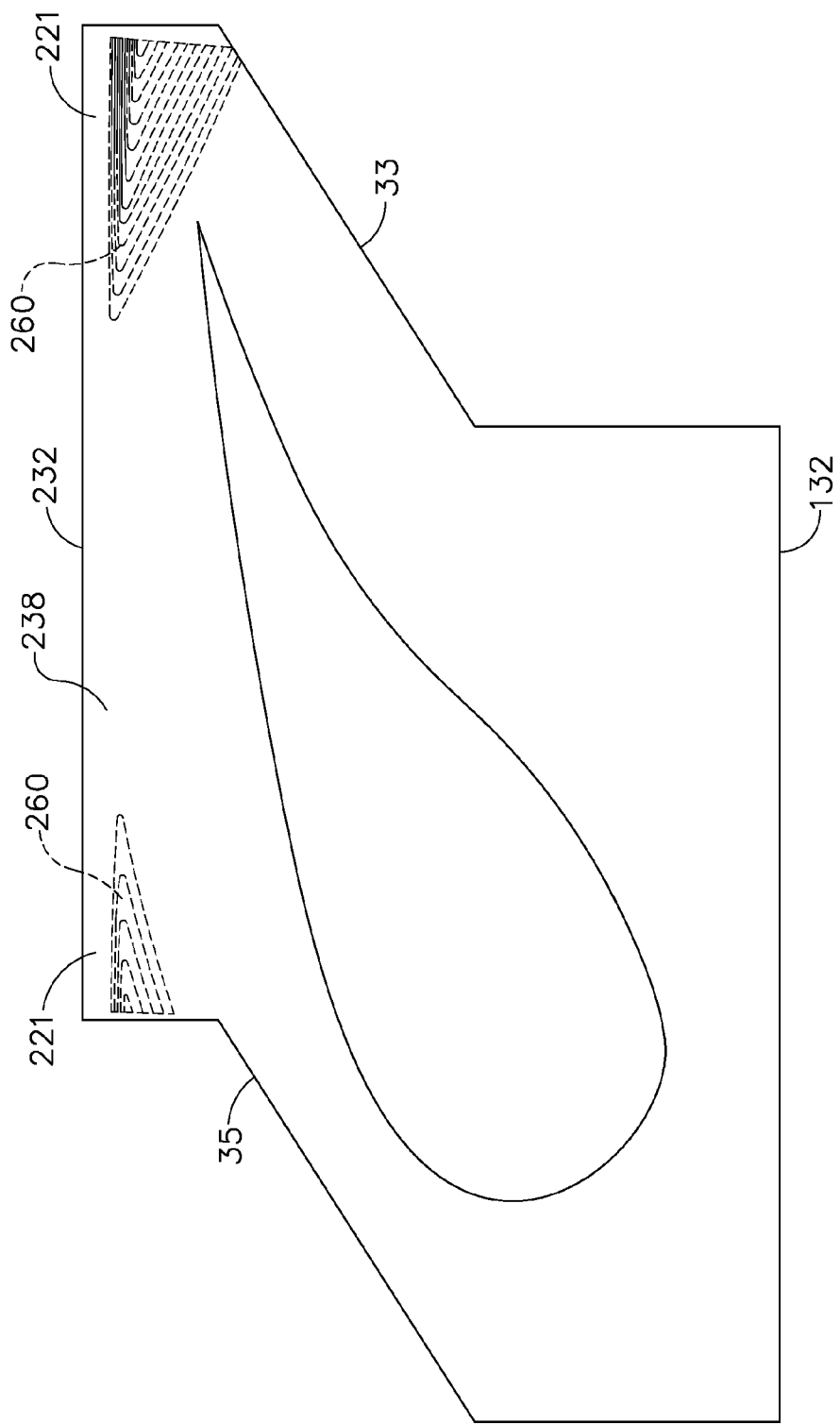
FIG. 18 is a diagrammatic view illustration of insert plies of inserts along pressure and suction side edges of the outer band of the turbine nozzle illustrated in FIG. 15.

Illustrated in FIGS. 14-18 are gradually thickened areas 221 of the outer band segment 26 near the outer aft flange 134 and the segment trailing edge 46 of the outer band segment 26 relative to a relatively constant unthickened area 223 of the outer band segment 26. Exemplary embodiments of the thickened areas 221 are illustrated herein in corners 222 of the outer aft flange 134 along the pressure and suction side edges 33, 35 of the radially outer band segment 26. The thickened area 221 is thickest at the pressure and suction side edges 33, 35 of the radially outer band segment 26 and thinnest near a middle 238 of the outer band segment 26 as illustrated in FIGS. 16-18. The thickened area 221 tapers off in thickness T from an aft end 240 of the thickened area 221 forwardly towards the forward flange 90 (illustrated in FIG. 10) of the radially outer band segment 26.

The outer band segment 26 is made up of band plies 248. A first plurality of the band plies 248 are flowpath plies 252 which are closest to a flowpath 250 through the composite nozzle segment 11 between the outer and inner band segments 26, 27 (as illustrated in FIG. 10) and primarily provide the flowpath geometry of the outer band segment 26. A second plurality of the band plies 248 are structural plies 254 that are farthest from the flowpath 250 and provide primarily structural support for the outer band segment 26. The thickening of the segment trailing edge 46 of the outer band segment 26 enables the structural plies 254 to react support loads in compression and prevents unwanted bending. The thickening may be done by inserting insert plies 260 between the band plies 248 within the thickened areas 221 of the outer band segment 26. The insert plies 260 are covered with covering plies 263 which are made up of some outermost ones of the band plies 248 as illustrated in FIGS. 14 and 15.

The insert plies 260 may be grouped together in a discrete group 262 as illustrated in FIG. 14. Alternatively, the insert plies 260 may be distributed or interspersed with some of the band plies 248 and, more particularly, with some of the structural plies 254 as illustrated in the exemplary embodiment of the thickened area 221 illustrated in FIG. 15. The insert plies 260 have a generally triangular planform shapes S with widths W that narrow from the pressure and suction side edges 33, 35 towards the middle 238 of the outer band segment 26 as illustrated in FIGS. 16-18 in which covering plies 263 have been removed to facilitate in illustrating the insert plies.

FIGS. 16-18 also illustrate that the thickened areas 221 along the pressure and suction side edges 33, 35 of the outer band segment 26 may be different. One of the thickened areas 221 may be larger both in width W and chordal length CL and may be thicker than the other and have more and larger insert plies 260 than the other. This is done to align the outer chordal seal line 232 on the outer aft flange 134 with the inner chordal seal line 132 of the chordal hook 150, which are angularly offset from each other about the centerline axis 12, so that they are parallel as illustrated in FIGS. 10 and 18.

As illustrated in FIGS. 14 and 15, the flowpath plies 252 may be wrapped around an outer band aft end 270 of the structural plies 254 to form, at least in part, the outer aft flange 134 of the outer band segment 26. The wrapped flowpath plies 252 provide a smooth contact surface 272 along the inner chordal seal line 132 and protect aft ends 274 of the structural plies 254 from environmental damage or abrasion and delamination due to sliding contact with the turbine shroud 231 (illustrated in FIG. 1) along the outer band chordal seal 230 between the outer aft flange 134 and the turbine shroud 231 along the outer chordal seal line 232 of the outer aft flange 134.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended Claims all such modifications as fall within the true spirit and scope of the invention.

Accordingly, what is desired to be secured by Letters Patent of the United States is the invention as defined and differentiated in the following Claims:

1. A composite article and frame assembly comprising:
    a composite article having plys,
    a support frame including a rail engaging a hook of the composite article,
    the rail including a rail contact surface generally conformal to and contacting a hook contact surface of the hook, and
    the rail and hook contact surfaces being substantially normal to the plys beneath the hook contact surface.

2. An assembly as claimed in claim 1, further comprising the hook and the rail being straight.

3. An assembly as claimed in claim 1, further comprising the hook and the rail being arcuate.

4. An assembly as claimed in claim 1, further comprising the composite article being a composite nozzle segment including one or more airfoils extending radially between radially outer and inner band segments and the outer and inner band segments being arcuate and curved about a centerline axis.

5. A composite nozzle segment and frame assembly comprising:
    a composite nozzle segment including one or more airfoils extending radially between arcuate radially outer and inner band segments having plys and curved about a centerline axis,
    a support frame including a rail engaging a hook of the radially inner band segment,
    the rail including a rail contact surface generally conformal to and contacting a hook contact surface of the hook, and
    the rail and hook contact surfaces being substantially normal to the plys beneath the hook contact surface.

6. An assembly as claimed in claim 5, further comprising the hook and the rail being straight.

7. An assembly as claimed in claim 5, further comprising the hook and the rail being arcuate.

8. An assembly as claimed in claim 5, further comprising:
    each of the airfoils including pressure and suction sides extending axially between airfoil leading and trailing edges and extending radially between the inner and outer band segments,
    the inner and outer band segments including segment leading and trailing edges generally corresponding to the airfoil leading and trailing edges respectively, and
    the hook being located at the segment leading edge of the inner band segment and curved radially inwardly and axially aftwardly from the segment leading edge.

9. An assembly as claimed in claim 8, further comprising the hook and the rail being straight.

10. An assembly as claimed in claim 8, further comprising the hook and the rail being arcuate.

11. An assembly as claimed in claim 8, further comprising the frame including a central body extending axially aftwardly from the rail to an aft frame flange.

12. An assembly as claimed in claim 11, further comprising the frame including a mounting flange extending radially inwardly from a forward position of the central body aft of the rail.

13. An assembly as claimed in claim 11, further comprising a frame pin or a tab mounted on the frame and engaging the inner band segment or one of the airfoils.

14. An assembly as claimed in claim 13, further comprising the frame pin having a threaded radially inner end screwed into a threaded boss on the frame.

15. An assembly as claimed in claim 8, further comprising the frame clamped to the composite nozzle segment by a clamp.

16. An assembly as claimed in claim 15, further comprising:
   at least one of the airfoils being hollow and having a cavity,
   the clamp including a threaded rod extending through the cavity,
   the rod including a threaded radially inner end screwed into a threaded boss on the frame, and
   a load spreader attached to a threaded radially outer end of the rod with a nut, and
   the load spreader engaging the outer band segment to clamp the frame to the composite nozzle segment.

17. An assembly as claimed in claim 16, further comprising the hook and the rail being straight.

18. An assembly as claimed in claim 16, further comprising the hook and the rail being arcuate.

19. An assembly as claimed in claim 16, further comprising the frame including a central body extending axially aftwardly from the rail to an aft frame flange.

20. An assembly as claimed in claim 19, further comprising the frame including a mounting flange extending radially inwardly from a forward position of the central body aft of the rail.

21. A turbine nozzle and support assembly comprising:
   a circular row of composite nozzle segments,
   each composite nozzle segment in the circular row of composite nozzle segments contacting a frame for transferring axial loads from the composite nozzle segment to an aft nozzle support,
   the composite nozzle segment including one or more airfoils extending radially between arcuate radially outer and inner band segments having plys and curved about a centerline axis,
   the support frame including a rail engaging a hook of the radially inner band segment,
   the rail including a rail contact surface generally conformal to and contacting a hook contact surface of the hook, and
   the rail and hook contact surfaces being substantially normal to the plys beneath the hook contact surface.

22. An assembly as claimed in claim 21, further comprising:
   the frame including a central body extending axially aftwardly from the rail to an aft frame flange having an aft facing peaked surface,
   a support flange of the aft nozzle support, and
   an axial load path through the frame to the support flange.

23. An assembly as claimed in claim 22, further comprising the hook and the rail being straight.

24. An assembly as claimed in claim 22, further comprising the hook and the rail being arcuate.

25. An assembly as claimed in claim 22, further comprising:
   each of the airfoils including pressure and suction sides extending axially between airfoil leading and trailing edges and extending radially between the inner and outer band segments,
   the inner and outer band segments including segment leading and trailing edges generally corresponding to the airfoil leading and trailing edges respectively, and
   the hook being located at the segment leading edge of the inner band segment and curved radially inwardly and axially aftwardly from the segment leading edge.

26. An assembly as claimed in claim 25, further comprising the hook and the rail being straight.

27. An assembly as claimed in claim 25, further comprising the hook and the rail being arcuate.

28. An assembly as claimed in claim 25, further comprising the frame including a central body extending axially aftwardly from the rail to an aft frame flange.

29. An assembly as claimed in claim 28, further comprising a frame pin or a tab mounted on the frame and engaging the inner band segment or one of the airfoils.

30. An assembly as claimed in claim 29, further comprising the frame pin having a threaded radially inner end screwed into a threaded boss on the frame.

31. An assembly as claimed in claim 25, further comprising the frame clamped to the composite nozzle segment by a clamp.

32. An assembly as claimed in claim 31, further comprising:
   at least one of the airfoils being hollow and having a cavity,
   the clamp including a threaded rod extending through the cavity,
   the rod including a threaded radially inner end screwed into a threaded boss on the frame, and
   a load spreader attached to a threaded radially outer end of the rod with a nut, and
   the load spreader engaging the outer band segment to clamp the frame to the composite nozzle segment.

33. An assembly as claimed in claim 32, further comprising the hook and the rail being straight or the hook and the rail being arcuate.

* * * * *